United States Patent

Aoyama et al.

[11] Patent Number: 6,163,004
[45] Date of Patent: Dec. 19, 2000

[54] METHOD OF WELDING PROJECTION NUT AND APPARATUS THEREFOR

[75] Inventors: Yoshitaka Aoyama; Shoji Aoyama, both of Sakai, Japan

[73] Assignee: Yoshitaka Aoyama, Osaka, Japan

[21] Appl. No.: 09/043,213

[22] PCT Filed: Aug. 11, 1997

[86] PCT No.: PCT/JP97/02815

§ 371 Date: May 29, 1998

§ 102(e) Date: May 29, 1998

[87] PCT Pub. No.: WO98/06530

PCT Pub. Date: Feb. 19, 1998

[30] Foreign Application Priority Data

Aug. 10, 1996 [JP] Japan ................................. 8-242454
Oct. 12, 1996 [JP] Japan ................................. 8-305462
Oct. 22, 1996 [JP] Japan ................................. 8-315386
Oct. 28, 1996 [JP] Japan ................................. 8-323262

[51] Int. Cl.[7] ........................... B23K 9/28; B23K 11/00
[52] U.S. Cl. .......................................... 219/93; 219/148
[58] Field of Search ............................ 219/93, 148

[56] References Cited

U.S. PATENT DOCUMENTS 2,905,803  9/1959  Brady ............................................ 219/93
5,705,784  1/1998  Aoyama et al. ............................ 219/119

FOREIGN PATENT DOCUMENTS 53-88981  7/1978  Japan .
57-3478   1/1982  Japan .

Primary Examiner—Patrick Ryan
Assistant Examiner—Anjan Dey
Attorney, Agent, or Firm—Pollock, Vande Sande & Amernick

[57] ABSTRACT

When a projection nut is brought into an intended position, in order that welding may be completed with the nut kept at accurate posture and the nut fed in correct position, a recess (21) is formed at the leading end of a feed rod (20), the feed rod (20) is moved back in a direction almost orthogonal to the axial line of an electrode, and when the feed rod (20) is stopped, a guide pin (13) of an electrode (11) gets into a screw hole (26) of a projection nut (25), and then the feed rod (20) is restored to determine the position of the nut (25), then the other electrode (19) advances to complete the welding.

9 Claims, 5 Drawing Sheets

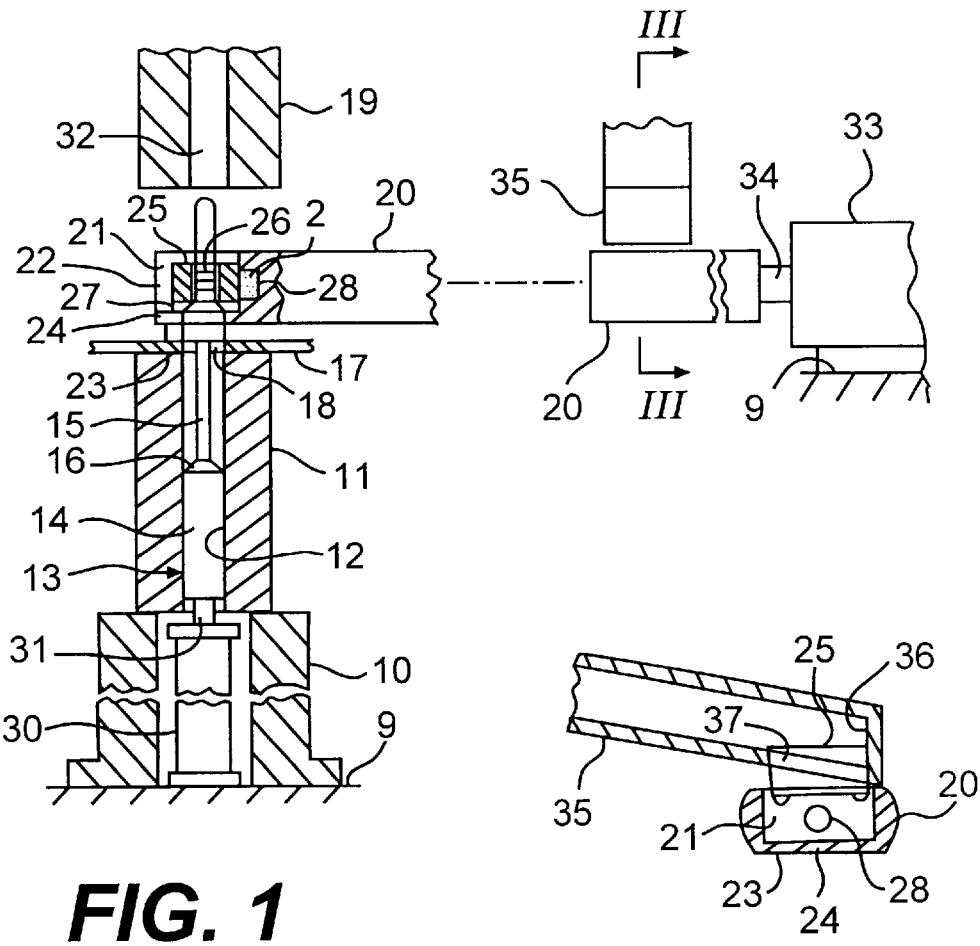
FIG. 1
FIG. 3
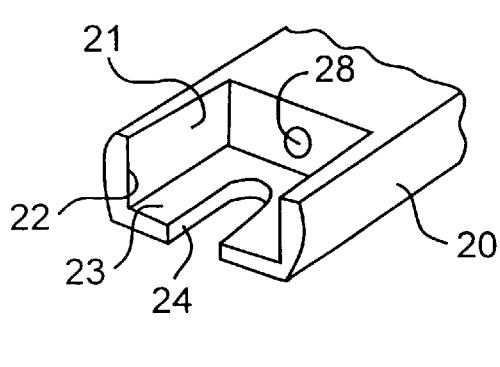
FIG. 2
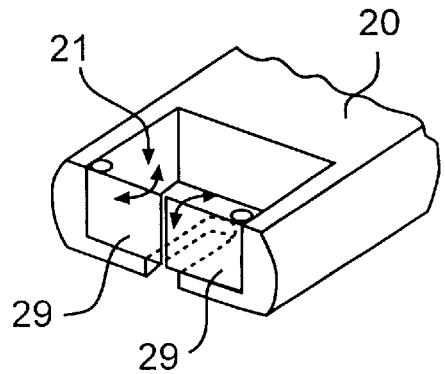
FIG. 2A

METHOD OF WELDING PROJECTION NUT AND APPARATUS THEREFOR

TECHNICAL FIELD

The present invention relates to welding of projection nut after matching with a guide pin of a fixed electrode by moving a feed rod back and forth.

BACKGROUND ART

As known hitherto, a feed rod is forwarded from a direction nearly orthogonal to the axial line of an electrode, when a projection nut held in the feed rod comes just above a guide pin, the held projection nut is released and dropped into the guide pin. Such an example is disclosed in Japanese Laid-open Patent No. 51-109247. The disclosed art is as shown in FIG. 10, in which a hollow feed rod 1 is disposed so as to move back and forth nearly in the horizontal direction, and a box type part container 2 is formed at the leading end thereof Since the lower side of the part container 2 is open, a sliding plate 3 is placed, and the sliding motion is effected by a reciprocating rod 4. A steel plate part 6 is mounted on an electrode 5, and a guide pin 7 of the electrode 5 projects upward while penetrating through the steel plate part 6. The part is a projection nut indicated by reference numeral 8. The other electrode making a pair with the electrode 5 is omitted in the drawing.

FIG. 10 shows the projection nut 8 being supplied on the steel plate part 6 as indicated by solid line as the feed rod 1 moves forward, and the operation is described below. The feed rod 1 moves forward from a direction nearly orthogonal to the electrode 5, and when the nut 8 indicated by twin dot chain line comes to be coaxial with the guide pin 7, the feed rod 1 stops, and then the reciprocating rod 4 is moved back, and the lower side of the part container 2 is opened, so that the nut 8 drops, with the guide pin 7 driven into the screw hole as indicated by solid line, thereby finishing the feed of the nut. Then, the other electrode moves forward, and projection welding is completed.

In such prior art, since the projection nut 8 is dropped onto the guide pin 7, if the nut 8 is inclined in the transient period of fall, it may be repelled by the end of the guide pin 7, and may not be placed correctly as indicated by the solid line. Such an abnormal phenomenon may also occur if the feed rod 1 does not stop at a correct position due to a relative configuration with the guide pin 7. Moreover, the projection nut may be deviated in the rotating direction from the guide pin 7, and may not be welded in a uniform direction on the steel plate part 6.

BRIEF DESCRIPTION OF THE INVENTION

In one aspect of the invention, a welding apparatus of a projection nut is characterized by setting the forward and backward direction of a feed rod in a direction nearly orthogonal to an axial line of an electrode, forming a recess for holding a projection nut opened at the leading end of the feed rod, placing holding means of a projection nut in this recess, and placing a guide pin to advance into a screw hole of the projection nut stopped at a position nearly coaxial with the electrode in a state free to move in and out of the electrode. When the projection nut and guide pin are stopped nearly at coaxial positions, the guide pin advances to get into the screw hole of the nut, and when the feed rod moves back, the nut is released from the holding means and remains on the guide pin, and later the other electrode operates to complete projection welding. According to the invention, as the projection nut is held by the holding means in the recess of the feed rod, the guide pin of the advancing electrode gets into the screw hole in the projection nut, and then the feed rod moves backward, and therefore the projection nut is prohibited from moving an in abnormal direction both in the recess and by the guide pin, so that the problem of deviation of position of the nut due to a fall as in the prior art can be solved securely. Therefore, it is possible to weld whether the axial line of the electrode is in the vertical direction or horizontal direction.

In the bottom plate of the recess, a notch groove for passing the guide pin may be opened and formed at the leading end side of the feed rod. As the guide pin advances, it passes through the notch groove and gets into the screw hole in the nut, and then when the feed rod moves back in this state, the guide pin passes through the notch groove to wait for advancement of the other electrode while holding the nut, and afterwards projection welding is completed in the same manner. Since the notch groove is opened and set at the leading end side of the feed rod, if the guide pin penetrates through the screw hole of the nut, the backward motion of the feed rod is permitted. Thus, since the guide pin can penetrate through the nut like a skewer, the holding state of the nut is more stabilized.

Alternatively, the guide pin may have a large end and a small end, a slope is provided in the boundary of the both ends, small end penetrates through the screw hole in the projection nut, and the slope is engaged with the end portion of the screw hole, and in this case, by the engaging action of the slope, the projection nut is centered. Since the guide pin comprises the large end, small end and slope, the small end securely penetrates through the nut, and the holding stability is enhanced, and moreover the nut is centered by the relation of the slope and screw hole end portion, so that the welding position of the nut may be obtained at high precision.

When both electrodes approach each other, in order that the small end may not interfere with the other electrode, a receiving hole for receiving the small end of the guide pin may be provided in the other electrode. As the receiving hole for the small end is drilled in the other electrode, when the both electrodes approach each other to be welded, the small end would not interfere with the other electrode, and a secure motion is obtained. As the small end gets into the receiving hole and the feed rod is restored, abnormal motion of the nut is constrained, so that positioning of the nut is assured.

The guide pin may be provided with suction means for preventing position deviation of the projection nut. When the projection nut is engaged with the guide pin, since the projection nut is restrained by the guide pin, if the projection nut is going to be deviated in the rotating direction from the guide pin due to vibration of the welding apparatus or other cause, the position is not deviated easily. Since the guide pin is provided with suction means for the nut, if only the nut is left over on the guide pin, the nut is attracted to the guide pin, and therefore if any external force acts on the nut, the nut is not easily moved in the rotating direction. Thus, the nut is welded always in a uniform direction on the opposite part.

A welding method of projection nut of the invention comprises the steps of setting the forward and backward direction of a feed rod in a direction nearly orthogonal to the axial line of an electrode, forming a recess for holding a projection nut opened at the leading end portion of the feed rod, placing holding means of the projection nut in the recess, stopping the projection nut at the position nearly coaxial with the electrode, then allowing the guide pin of the electrode to advance into the screw hole of the projection nut, moving back the feed rod in the advanced state to keep the projection nut engaged with the guide pin, and moving the electrode forward to complete welding. The feed rod moves in forward and backward strokes, the guide pin similarly moves back and forth, and by a combination of both motions, the nut is supplied at a specified position and welded securely. The feed rod makes a simple reciprocating action, and the guide pin moves back and forth in a direction nearly orthogonal thereto, and therefore constraint of the nut by nut feed by the feed rod and by the guide pin is realized in a very simple action, so that a highly reliable action is obtained from the welding method.

In another aspect of the invention, a recess for receiving the projection nut with a protrusion for fusion is opened downward and formed in the leading end of the retractable feed rod, and a defining plane for setting the vertical position of the projection nut and a vertical wall for setting the central position of the projection nut are provided in the recess, and the height position of the protrusion for fusion of the projection nut positioned by the defining plane is shifted to the upper side of the protrusion for fusion of the subsequent projection nut, thereby setting up so that the protrusions for fusion of the both projection nuts may not interfere with each other, and the projection nut is brought into contact with the defining plane and vertical wall by the suction means provided in the feed rod. The nut is guided into the recess by the suction means, the upper surface of the nut contacts with the defining plane, the lateral plane of the nut contacts with the vertical wall, and the position of the nut is determined, and the relative configuration with the succeeding nut is as mentioned above, so that mutual interference of protrusions for fusion can be avoided.

In the recess at the leading end of the feed rod, a defining plane for setting the vertical position of the nut and the vertical wall for setting the central position of the nut are formed, and suction means is installed, and therefore the nut contacts both the defining plane and vertical wall, and the relative positions of the nut and feed rod are determined accurately. Hence, since the protrusion for fusion of the succeeding nut is shifted in the vertical direction of the leading nut, the two protrusions will not interfere with each other. Therefore, when the feed rod moves forward, the protrusions for fusion will not interfere with each other, so that a smooth motion is achieved.

The feed rod may be provided with a notch so that the guide pin of the electrode may penetrate through the screw hole in the projection nut. When the screw hole of the nut is coaxial with the guide pin, the guide pin goes up to penetrate the nut, passing through the notch like a skewer. When the guide pin of the electrode is utilized so as to penetrate the screw hole in the nut, only the nut is left over the guide pin after the feed rod moves backward, so that smooth projection welding is realized.

Whether the defining plane is the upper side or lower side, the actions of the vertical wall and suction means are combined, and the nut can be handled as being shifted as mentioned above. That is, a recess for receiving a projection nut with a protrusion for fusion is opened upward and formed in the leading end of the feed rod that moves back and forth, and a defining plane for setting the vertical position of the projection nut and a vertical wall for setting the central position of the projection nut are provided in this recess, the height position of the protrusion for fusion of the projection nut positioned by the defining plane is shifted to the lower side of the protrusion for fusion of a succeeding projection nut so that the protrusions for fusion of both projection nuts may not interfere with each other, and the projection nut is brought into contact with the defining plane and vertical wall by suction means provided at least in the feed rod. The nut is positioned by the defining plane and vertical wall, and the relative configuration with the succeeding nut is as mentioned above, so that interference of protrusions for fusion can be avoided.

Referring now to the accompanying drawings, embodiments of the invention are described in detail below.

BRIEF DESCRIPTION OF THE DRAWINGS

FIG. 1 is a longitudinal sectional view of a welding apparatus of a projection nut showing an embodiment of the invention.

FIG. 2 is a perspective view of a leading end portion of a feed rod.

FIG. 2A is a perspective view similar to FIG. 2 showing a modified example.

FIG. 3 is a sectional view of III—III in FIG. 1.

DETAILED DESCRIPTION OF THE INVENTION

Figure 4:
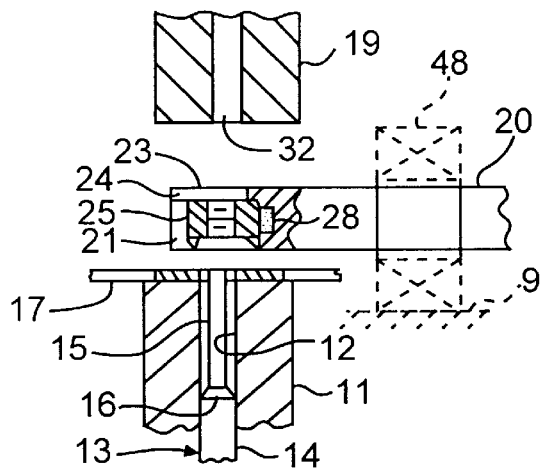
FIG. 4 is a longitudinal sectional view showing a modified example of a feed rod having a recess opened downward.

First, explaining an embodiment in FIG. 1 through FIG. 3, a cylindrical base 10 on a stationary member 9 is fixed, and a fixed electrode 11 is firmly bonded thereon. In the central part of the fixed electrode 11, a guide hole 12 is opened in a penetrating state, and a guide pin 13 is inserted slidably therein. The guide pin 13 is composed of a large end 14 and a small end 15, and a slope 16 is provided in the boundary of both ends 14, 15. A steel plate part 17 is mounted on the fixed electrode 11, and by fixing the steel plate part 17 by positioning means, not shown, a positioning hole 18 opened in the steel plate part 17 and the guide hole 12 are matched as shown in the drawing.

Making a pair with the fixed electrode 11, a movable electrode 19 is installed in a state free to move back and forth. Forward and backward motion of the movable electrode 19 is generally done by an air cylinder, and explanation is omitted herein. A feed rod 20 is installed so as to move back and forth in a direction almost orthogonal to the axial line of the electrode, and a recess 21 holds the part. An exit of the recess is indicated at 22. As magnified in FIG. 2, the recess 21 is opened on top, and a notch groove 24 is formed in a bottom plate 23 of the recess 21. The part is an iron-made projection nut 25, and reference numeral 26 is a screw hole and 27 is a bead of welding material. The projection nut 24 is square in shape, and the dimensions are, for example, 10 mm by 10 mm, and 5 mm in thickness. Since the part is thus shaped, the recess 21 has a similar box shape. The nut 25 put in the recess 21 must not drop out of the recess or skewed in the recess 21 due to vibration of stopping of the feed rod 20, and therefore holding means is placed in the recess 21. As the holding means, the side or top of the nut may be lightly pressed down by a leaf spring, or the nut may be attracted by a vacuum, but a magnet (a permanent magnet) is used, for example. That is, a magnet 28 is embedded within the recess 21. As shown in FIG. 2A, hinge type gates 29 elastically thrust by a torsion coil spring or the like toward the inside of the recess 21 may be used also as holding means.

The guide pin 13 moves back and forth in the guide hole 12, and an air cylinder 30 is incorporated in the base 10 for this purpose, and its piston rod 31 is coupled to the guide pin 13. The movable electrode 19 has a receiving hole 32 for receiving the small end 15, and if the movable electrode 19 advances to the penetrating position of the small end 15 and then into the screw hole 26 of the nut 24, as indicated by twin dot chain line in the drawing, the small end 15 will not interfere the movable electrode 19.

Means for moving back the feed rod 20 may be easily realized by using an ordinary air cylinder. Therefore, an air cylinder 33 is fixed to the stationary member 9 at the right side in FIG. 1 as indicated by twin dot chain line, and its piston rod 34 is further coupled to the feed rod 20.

Figure 6:
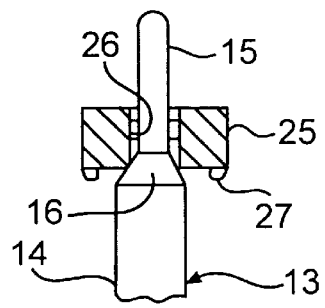
FIG. 6 is a longitudinal sectional view of a projection nut hooked on a guide pin.

FIG. 1 shows a state in which the feed rod 20 is advanced and stopped, so that the screw hole 26 of the nut is nearly coaxial with the positioning hole 18 and guide hole 12. When the guide pin 13 is raised by the operation of the air cylinder 30, the small end 15 passes through the notch groove 24 to penetrate in the screw hole 26 of the nut, thereby coming into a state as indicated by twin dot chain line. Consequently, as the feed rod 20 is drawn back, since the guide pin 13 penetrates through the screw hole 26, the magnet 28 is separated from the lateral side of the nut 25 by force. As a result, the end portion of the screw hole 26 is hooked on the slope 16 as shown in FIG. 6, and the nut is centered. Incidentally, the inside diameter of the screw hole 26 is, as understood from FIG. 6, is smaller than the large end 14 and larger than the small end 15. Afterwards, as the movable electrode 19 advances, the small end 15 gets into the receiving hole 32, and the end face of the movable electrode contacts tightly with the upper surface of the nut 25, and then, the guide pin 13 is pushed down by force (at this time, when air in the air cylinder 30 is exhausted, the guide pin is pushed down smoothly), the nut 25 is pressed against the steel plate part 17, and projection welding is completed in the process of power feed and fusion.

The above operating procedure and the operating procedure in the embodiments described below are easily executed by employing the general electrically controlled air changeover valve or electric control circuit, and disclosure of specific examples is omitted herein. In all embodiments, meanwhile, illustration of air hose to be connected to the air cylinder is omitted.

Referring next to a modified example shown in FIG. 4, as compared with the embodiment in FIG. 1 in which the recess 21 is opened upward as shown in FIG. 2, its direction is reverse or downward. In this modified example, only the releasing direction of the recess 21 is different, and the other constitution is exactly the same, and the same reference numerals as in the foregoing embodiments are used and a specific explanation is omitted. Besides, as indicated by the virtual line, the vicinity of the recess 231 may be magnetized by an electromagnetic coil 48 to fix the magnet 28.

Figure 5:
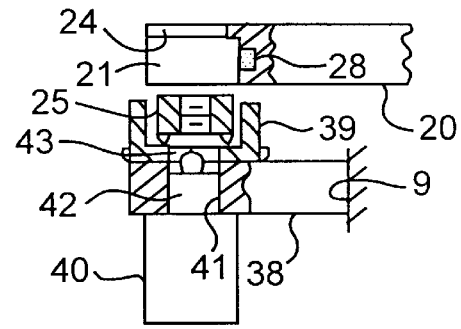
FIG. 5 is a longitudinal sectional view showing a method of feeding a part into the recess.

In the modified example in FIG. 4 in which the recess 21 is opened downward, an apparatus as shown in FIG. 5 may be employed for feeding a part into the recess 21. That is, a support member 38 is firmly fixed in the stationary member 9, and a feed chute 39 is fixed thereon. This chute has a pi-shaped section, and is opened upward, and is expanded in a direction orthogonal to the sheet of paper in FIG. 5. An air cylinder 40 is fixed at the lower side of the support member 28, and a piston rod 42 of the air cylinder penetrates through a penetration hole 41 drilled in the support member 38. Consecutively to the penetration hole 41, a through-hole 43 is also drilled in the bottom plate of the feed chute 39. The recess 21 of the feed rod 20 is positioned just above the nut 25. When the piston rod 42 is raised from the state in FIG. 5 by the operation of the air cylinder 40, the nut 25 is lifted, and is fed into the recess 21, and is attracted by the magnet 28.

Figure 7:
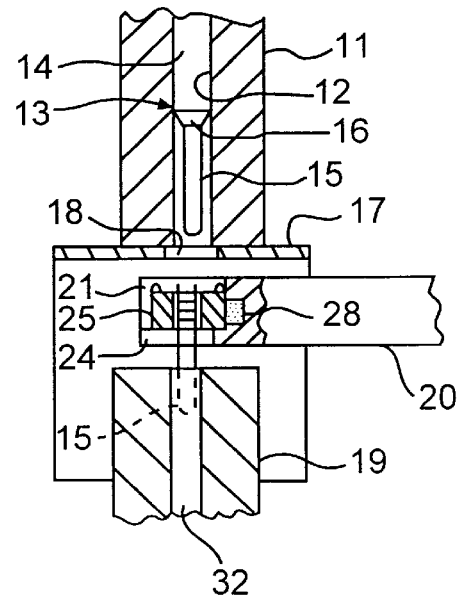
FIG. 7 is a longitudinal sectional view showing a modified example of inverting the configuration of electrodes.

A modified example in FIG. 7 is similar to the embodiment in FIG. 1, except that the configuration of the electrodes 11, 19 is upside down. Therefore, the same reference numerals are given and detailed description is omitted. Incidentally, when the feed rod 20 moves backward, the nut 25 drops on the top of the movable electrode 19, and therefore it is necessary to prevent the nut 25 from tumbling down. Accordingly, the small end 15 is preliminarily forwarded into the receiving hole 21 as indicated by twin dot chain line, or the leading end of the small end 15 is brought close to the top of the electrode, so that the small end 15 may have a guide function when the nut 25 falls down. This embodiment is suited to a case of welding a nut at the inside of a part in a shape such as pi-shaped section. In FIG. 7, the plate material shown at the inner side of the steel plate 17, the steel plate at the nearer side of the steel plate 17 although not shown, and the steel plate 17 are combined to form a pi-shape.

Figure 8:
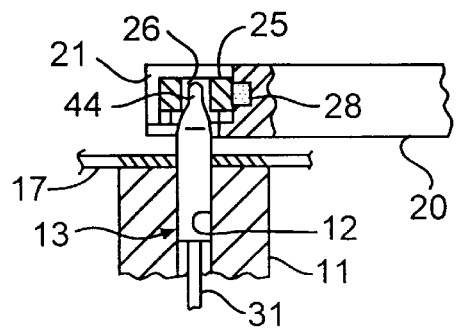
FIG. 8 is a longitudinal sectional view showing a modified example of a guide pin.

FIG. 8 shows a modified example in which the shape of the guide pin is different from the above. That is, instead of the composition composed of large end and small end, a short taper 44 is provided at the leading end portion of the guide pin 13, and this portion gets into the screw hole 26, and the small end does not penetrates through the screw hole as in the above example. In FIG. 8, the recess 21 is released upward, but when it is released downward, the guide pin penetrates the screw hole but does not pass through it, so that the notch groove 24 is not necessary.

Figure 11:
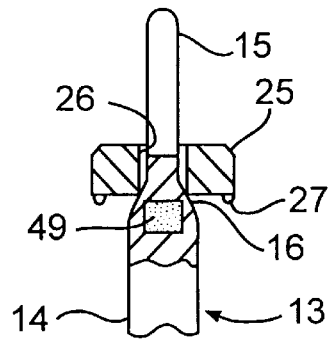
FIG. 11 is a longitudinal sectional view of a guide pin employing retaining means using a magnet.
Figure 12:
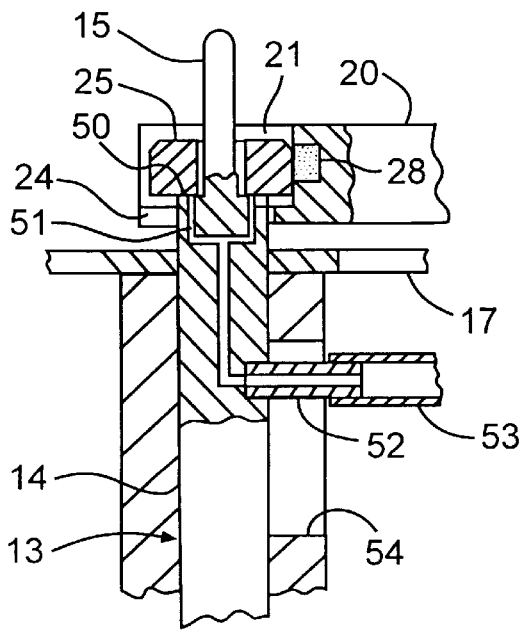
FIG. 12 is a longitudinal sectional view of a guide pin employing suction means utilizing a vacuum.
Figure 13:
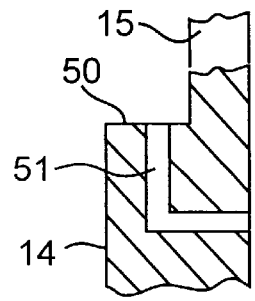
FIG. 13 is a partial magnified view of FIG. 12.

FIG. 11 through FIG. 13 show modified examples of providing the guide pin with suction means so that the relative positions of the nut 25 and guide pin 13 in the rotating direction may not be changed. Various forms may be considered for the suction means, and examples of using magnet and suction by air vacuum are shown herein. In FIG. 11, a magnet 49 is embedded near the slope 16, and when the nut 25 remains on the slope 16, the nut 25 is pressed against the slope 16, so that its position is not deviated in the rotating direction. In order to embed the magnet 16 as shown in the drawing, the guide pin 13 is cut out above the large end 14, and a recess is formed in the cut section, and the magnet 49 is fitted in, and the guide pin 13 is welded again to finish the outer surface smoothly.

Explaining a case of utilizing a vacuum in FIG. 12 and FIG. 13, not having the slope 16 as mentioned above, an end face 50 is provided on a plane orthogonal to the axial line of the guide pin 13 as shown in the drawing, in which a plurality of air passages 51 are opened, and these passages are connected to a vacuum pump not shown. That is, joint pipes 52 communicating with the air passages 51 are connected to the guide pin 13, and a flexible air hose 53 is connected thereto. Moreover, in order that the joint pipe 52 may move back and forth freely in the fixed electrode 11, a slot 54 is formed in the fixed electrode 11 in the forward and backward direction. When the lower end of the nut 25 contacts with the end face 50 to build up vacuum, the nut 25 is drawn to the end face and is not easily deviated in the rotating direction.

By forming a recess as shown in FIG. 2 matching with the square nut, the nut is accommodated and held securely, which is very advantageous for holding the nut while moving the feed rod. Moreover, since the recess of the feed rod also works to position the nut in the rotating direction, the relative position of the nut to the guide pin is securely made uniform, so that prevention of deviation of position and correct setting of welding position by the suction means (FIG. 11, FIG. 12) may be executed securely.

Figure 9:
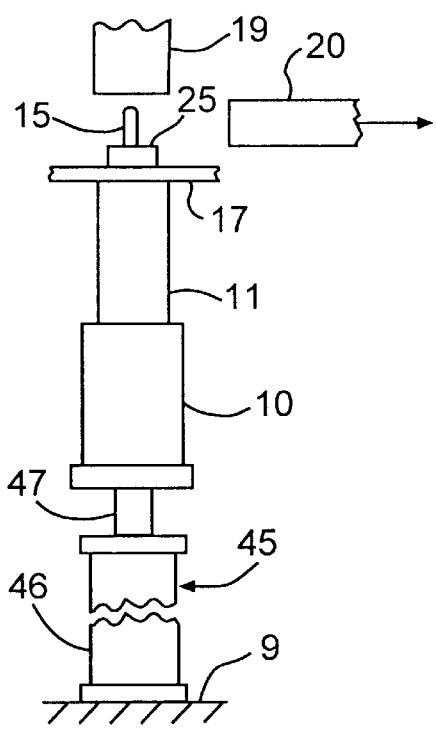
FIG. 9 is a side view showing a modified example of an electrode.
Figure 10:
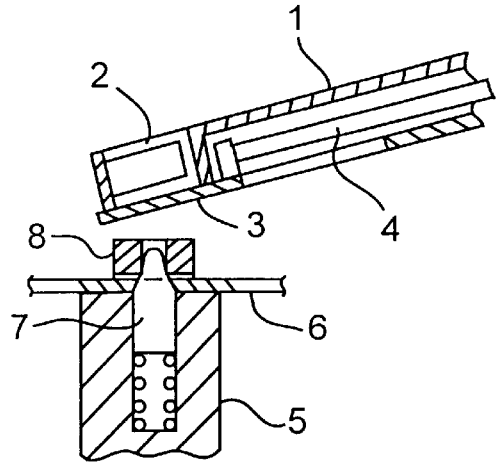
FIG. 10 is a longitudinal sectional view showing a prior art device.

In the embodiments explained so far, it is assumed that the fixed electrode is stopped still completely, but the electrode corresponding to this fixed electrode may advance together with the movable electrode, or only the electrode corresponding to the fixed electrode may advance. The former case is shown in FIG. 9. Herein, the base 10 is further supported from the lower side by driving means 45, and an air cylinder 46 is used as this means. The air cylinder 46 is fixed firmly on the stationary member 9, and its piston rod 47 is coupled to the base 10. Therefore, when the movable electrode 19 advances, the fixed electrode 11 also advances, and it is effective to shorten the working time.

Thus, both electrodes advance or only either electrode advances, and therefore as the requirements of the invention, the fixed electrode and movable electrode are not distinguished in the claims.

As a method of feeding the nut 25 into the recess 21, methods of holding the nut by the chuck and feeding, and holding the nut by another feed rod and feeding are known, among others, but a slope chute is used in the illustrated example. That is, a feed hose not shown is extended from the parts feeder, and a metallic slope chute 35 is connected thereto. As shown in FIG. 3, a stopper wall 36 is provided at the end of the slope chute, and an opening 37 is drilled so that the nut 25 stopped therein may fall in. This opening is positioned exactly above the recess 21, and the nut 25 falling down the slope chute 35 falls into the recess 21 as indicated by a twin dot chain line, and at the same time the nut 25 is attracted to the magnet 28, and is held in the recess 21.

The projection nut is generally square in shape, and a protrusion of material for fusion is disposed at the lower side of its four corners. In this kind of feeding apparatus, with an adjacently located projection nut in contact with the projection nut at the leading position, the leading projection nut is pushed out by the feed rod, and is fed on. The protrusion for fusion of the nut projects in an oblique direction, the protrusions for fusion of the leading nut and the adjacent nut may interfere with each other and the leading nut may not feed smoothly. Moreover, due consideration must be given to an extension of the guide pin of the welding electrode to penetrate the nut like a skewer.

Figure 14:
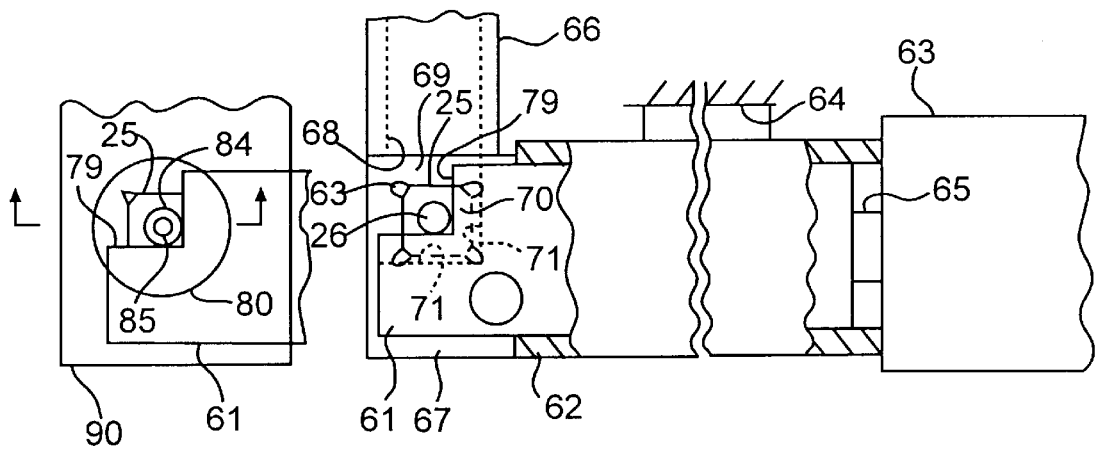
FIG. 14 is a partially cut-away plane view showing other embodiment of the invention.

Referring to FIG. 14, a retractable feed rod 61 is slidably inserted into a guide tube 62, and an air cylinder 63 is coupled to the end of the guide tube 62. The guide tube 62 is firmly fixed to a stationary member 64, and a piston rod 65 of the air cylinder 63 is coupled to the feed rod 61. The feed rod 61 and guide tube 62 are of a rectangular section as shown in the drawing. A feed tube 66 of the part is disposed in a direction almost orthogonal to the forward and backward direction of the feed rod 61, and its guide plate 67 is coupled to the leading end of the guide tube 62. In other words, the bottom plate 67 and the lower side plate of the guide tube 62 are continuous.

Figure 15:
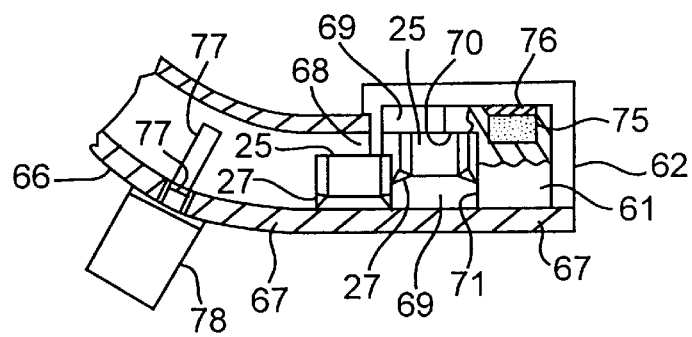
FIG. 15 is a cross sectional view passing through a nut portion in FIG. 14.
Figure 16:
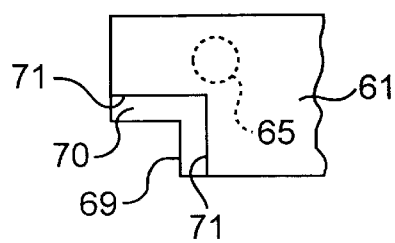
FIG. 16 is a bottom view of the leading end of a feed rod.

When the feed rod 61 is at the most backward position, the leading end of the feed rod 61 is slightly projecting from the guide tube 62, and the opening 68 of the feed tube 66 is positioned just beside the feed rod 61 (see FIG. 15). Confronting the opening 68, a recess 69 is formed in the feed rod 61, and this recess 69 communicates with the opening 68, and is released downward at the same time. The position corresponding to the ceiling of the recess 69 is a defining plane 70, and it sets the vertical position of the projection nut as mentioned later, and the interval of the bottom plate 67, surface and defining plane 70 is set larger than the height of the projection nut, and a vertical deviation is given to the protrusion for fusion as mentioned later as shown in FIG. 15. Besides, to set the central position of the projection nut, a vertical wall 71 is formed in the recess 69. This vertical wall 71 has two planes set in an orthogonal state as shown in FIG. 14 and FIG. 16.

Figure 17:
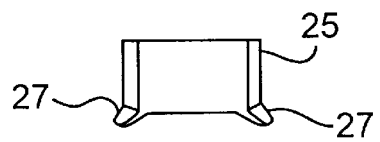
FIG. 17 is a side view of a projection nut.

Incidentally, the projection nut is indicated by reference numeral 25, and is square in shape as shown in FIG. 17, and protrusions for fusion 27 are projecting obliquely downward in the lower part of the four corners as described above. Reference numeral 26 (FIG. 18) shows a screw hole. The projection nut 25 is made of iron, and when it contacts with the defining plane 70 and vertical wall 71, the vertical direction position and central position of the projection nut 25 are determined. To maintain such contact, it requires means for attracting the projection nut 25 to both defining plane 70 and vertical wall 71. As such suction means, a method of action of air vacuum on the projection nut, a method of attracting by magnetic force, a method of gripping the nut by members such as leaf springs, and others may be considered, but a simplest method of using a permanent magnet is shown herein. More specifically, a magnet 75 is embedded in the feed rod 61, and a cover plate 76 is fitted in, and the position of the magnet 75 is set at higher position than the recess 69 as shown in FIG. 15 in order to allow the nut to contact the defining plane 70, and is also set at an obliquely lower position of the recess 69 as seen in FIG. 14 in order to allow the nut to contact with the vertical wall 71.

As shown in FIG. 15, the foremost nut 25 is positioned in the recess 69, and the succeeding nut is waiting at a position lower than the foremost nut. The succeeding nut 25 is at lower position, and the interval of the defining plane 70 and bottom plate 67 is determined so that the protrusions for fusion 27 may not interfere each other. That is, the height position of the protrusion for fusion 27 of the nut positioned by the defining plane 70 is shifted to the upper side of the protrusion for fusion of the succeeding nut, so that the protrusions for fusion of both nuts may not interfere with each other.

Since the feed tube 66 is extended from the parts feeder (not shown), the nut 25 may fall down from an elevated place at high speed, or may be conveyed by force by compressed air. In such conveying, since the nut is moved at high speed, if getting into the recess 69 directly at such high speed, the nut may be repelled by the vertical wall 71, or hit and damage the surface of the vertical wall 71. To prevent such trouble, a control pin 77 for pause is designed to be advanced into the feed tube 66. Accordingly, an air cylinder 78 is fixed to the outside of the feed tube 66, and its piston rod is designed to function as the control pin 77. As indicated by the twin dot chain line in FIG. 15, when the nut is sent at high speed into the projecting position of the control pin 77 in the feed tube 66, the nut 25 is stopped in position by the control pin 77, and when the control pin 77 moves back, the nut 25 is drawn into the recess 69 by the force of the magnet 75. In this way, the foremost nut 25 is stopped at the specified position of the recess 69. The nut getting into the recess 69 is pulled upward by the magnet 75, and is hence held at a position higher than the succeeding nut.

Suppose the nut 25 is not advanced into the recess 69. As the control pin 77 moves back and the nut 25 slides on the bottom plate 67 of the feed tube 66 to reach the opening 68, the force of the magnet 75 acts on the nut, and the nut 25 contacts both the defining plane 70 and vertical wall 71, so that the vertical direction and central position of the nut 25 are set at correct relative positions to the recess 69 of the feed rod 61. This attracted position is higher than the succeeding nut on the bottom plate 67, and therefore if the feed rod 61 is advanced ahead of the sheet of the paper in FIG. 15 in the vertical direction, the protrusions for fusion 27 will not interfere each other.

Figure 18:
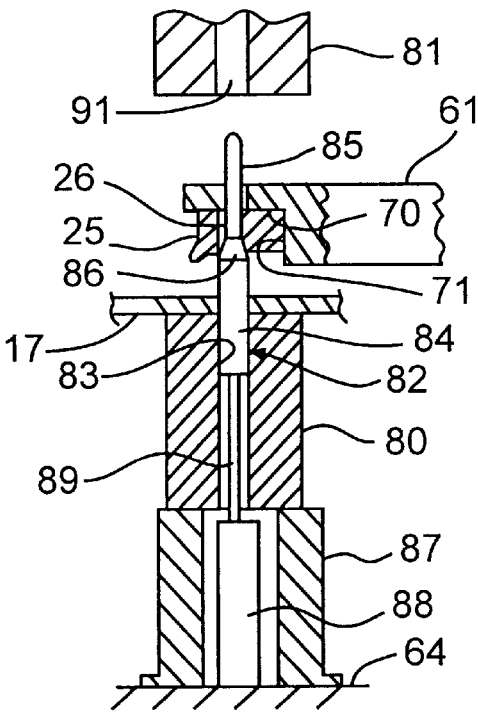
FIG. 18 is a longitudinal sectional view of a projection welding apparatus.

FIG. 18 shows a case of feeding the nut 25 between a fixed electrode 80 and a movable electrode 81. In the fixed electrode 80, a retractable guide pin 82 is inserted slidably into a central hole 83 of the same electrode, and its large end 84 slides in the hole 83, while the small end 85 penetrates the screw hole 26 of the nut 25. A taper 86 is formed between both ends 84, 85, and the lower end of the screw hole 26 is hooked thereon. The fixed electrode is fixed firmly on the base 87, and a piston rod 89 of an air cylinder 88 installed in the base 87 is coupled with the guide pin 82. In this way, the small end 85 skewers the screw hole 26, a notch 79 is needed (see FIGS. 14–16), and when the feed rod 61 moves back, it is designed so that the nut 25 remains in the guide pin 82. Meanwhile, on the fixed electrode 80, a steel plate part 17 is mounted as an opposite member.

Since the nut 25 held in the feed rod 61 is skewered by the guide pin of the electrode, the notch 79 is set in the feed rod 61, and when the feed rod 61 moves back, the screw hole 26 is exposed as shown in FIG. 14. As the feed rod 61 is advanced, it stops when the screw hole 26 of the nut 25 is coaxial with the retreating guide pin 82, and consequently when the guide pin 82 advances by the action of an air cylinder 88, the small end 85 penetrates the screw hole 26, and when the feed rod 61 moves back in this state, only the nut 25 is hooked on the taper 86 and remains in this place. Afterwards, as the movable electrode 81 descends, the small end 85 relatively gets into a receiving hole in the movable electrode, and when the movable electrode 81 further descends, the protrusion for fusion 27 is compressed to the steel plate part 17 while pushing down the guide pin 82, and then the current is fed, and projection welding of the nut 25 is completed.

In the explanations above and below, in order that a stronger force of the magnet 75 may act on the nut 25, the feed rod 61 is preferably manufactured of non-magnetic stainless steel. In the illustrated embodiments, a permanent magnet is shown, but it may be replaced by an electromagnet (see FIG. 4), which corresponds to one of attraction means of the invention.

Figure 19:
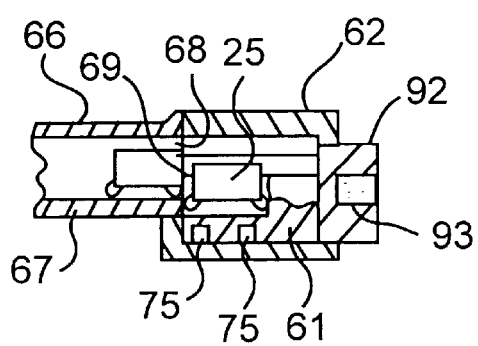
FIG. 19 is a cross sectional view similar to FIG. 15 showing a modified example.
Figure 21:
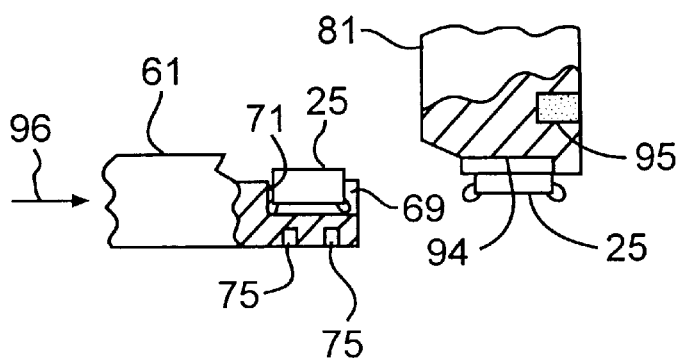
FIG. 21 is a side view showing a configuration of a feed rod and electrode.
Figure 20:
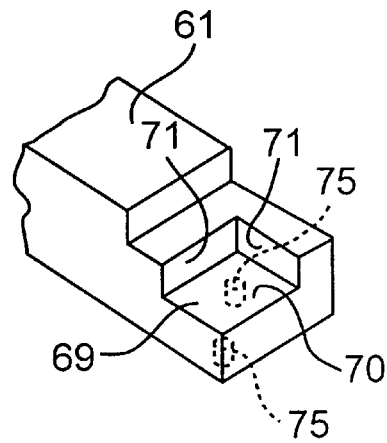
FIG. 20 is a perspective view of a feed rod in FIG. 19.

Referring further to FIG. 19 through FIG. 21, herein, the vertical direction is upside down as compared with the embodiment in FIG. 15, and the components having the same function as in the embodiment in FIG. 14 are identified with the same reference numerals, and the detailed description is omitted. The feed tube 66 has its opening 68 welded above the guide tube 62, the nut 25 on the defining plane 70 is at a lower position than the succeeding nut, so that protrusions for fusion of both nuts may not interfere directly each other as shown in the drawing. The procedure of setting the magnet on the feed rod may be same as in the foregoing embodiments, but magnets are dispersed herein. That is, two magnets 75 are embedded at the lower side of the defining plane 70 so as to attract the nut 25 to the defining plane 70. On the other hand, other magnet 93 is embedded in a support piece 92 welded so as to be fitted into the guide tube 62, and its position is set obliquely downward of the recess 69 so that the nut 25 may be attracted to both vertical walls 71.

As shown in FIG. 21, a recess 94 of receiving the nut 25 is formed in the movable electrode 81, and the nut 25 is held by embedded the magnet 95. The feed rod 61 is designed to feed the nut 25 held in the recess 69 advancing from the direction of arrow 96 into the electrode receiving recess 94. In this embodiment, since the magnets are dispersed out of the feed rod, the attraction means is at least disposed in the feed rod.

By setting the interval of the bottom plate of the feed tube and the defining plane of the recess larger than the nut height, the difference in vertical height between the foremost nut and succeeding nut may be properly maintained, and the interference problem of the protrusions for fusion can be solved securely. Since the setting positions of the magnets are as mentioned above, the nut is attracted to both the defining plane and the vertical wall, so that positioning of the nut may be achieved securely.

What is claimed is:

1. A welding apparatus for welding projection nuts to a work piece, and comprising:

a first electrode for supporting the work piece;

a feed rod reciprocating along a direction substantially orthogonal to an axis of the electrode;

an outer end section of the feed rod having a recess formed therein for intimately holding the projection nut in the recess;

means located in at least one wall of the recess for removably capturing a nut within the recess;

means for displacing the feed rod and captured nut to a desired position over an opening in the work piece in preparation for welding;

a slidable guide pin located in the electrode and adapted to extend through the electrode for passage through the opening in the work piece and an aligned threaded hole in the nut thereby maintaining the nut in coaxial relation with the work piece opening;

means for retracting the feed rod thereby freeing the nut from the recess while the nut is maintained in position by the guide pin; and a second electrode for urging a free surface of the nut against the work piece in preparation for welding; and means for withdrawing the guide pin from the threaded hole during welding.

2. A welding apparatus as set forth in claim 1 wherein a base of the recess has an elongated notch extending inwardly of an edge of the base for allowing passage of the guide pin through the notch, and subsequently allowing retraction of the feed rod after the guide pin has engaged the nut.

3. A welding apparatus as set forth in claim 2 wherein the guide pin includes a large end and an opposite small end separated by a sloping surface, the small end penetrating the threaded hole of the nut, and the sloping surface engaging a transverse end of the nut.

4. A welding apparatus as set forth in claim 3 wherein a receiving hole for receiving the small end of the guide pin is provided in second electrode.

5. A welding apparatus as set forth in claim 1 wherein the guide pin is provided with means for attracting the nut thereto for preventing position deviation of the nut.

6. A method for welding projection nuts to a work piece, and comprising the steps:

supporting the work piece on a first electrode;

displacing a feed rod along a direction substantially orthogonal to an axis of the electrode;

intimately holding the projection nut in a recess formed in an outer end section of the feed rod;

removably capturing a nut within the recess;

displacing the feed rod and captured nut to a desired position over an opening in the work piece in preparation for welding;

extending a slidable guide pin, located in the electrode, through the electrode for passage through the opening in the work piece and an aligned threaded hole in the nut, thereby maintaining the nut in coaxial relation with the work piece opening;

retracting the feed rod thereby freeing the nut from the recess while the nut is maintained in position by the guide pin; and subjecting a free surface of the nut to contact by a second electrode for urging the nut against the work piece in preparation for welding; and withdrawing the guide pin from the threaded hole during welding.

7. A feeding apparatus for projection nuts having protrusions of welding material attached thereto, the apparatus comprising:

a feed rod reciprocating along a preselected direction;

an outer end section of the feed rod having a recess formed therein for intimately holding the projection nut in the recess;

the recess opened downward and having its base defining a plane for setting the vertical position of the projection nut, the recess further having a vertical wall for centering the position of the projection nut;

means for shifting the plane to an upper end of the protrusion of an upstream adjacently positioned nut thereby offsetting the protrusions of the nut and the adjacently positioned nut to avoid the interference of the protrusions on the adjacently positioned nuts; and means located in the feed rod for removably retaining the nut against the plane in the recess.

8. A feeding apparatus set forth in claim 7 wherein the recess has a notch formed therein to allow passage of a welding electrode guide pin through the notch as well as through a threaded hole in a projection nut.

9. A feeding apparatus for projection nuts having protrusions of welding material attached thereto, the apparatus comprising:

a feed rod reciprocating along a preselected direction;

an outer end section of the feed rod having a recess formed therein for intimately holding the projection nut in the recess;

the recess opened upward and having its base defining a plane for setting the vertical position of the projection nut, the recess further having a vertical wall for centering the position of the projection nut;

means for shifting the plane to a lower end of the protrusion of an upstream adjacently positioned nut thereby offsetting the protrusions of the nut and the adjacently positioned nut to avoid the interference of the protrusions on the adjacently positioned nuts; and means located in the feed rod for removably retaining the nut against the plane in the recess.

* * * * *